Figure 2:
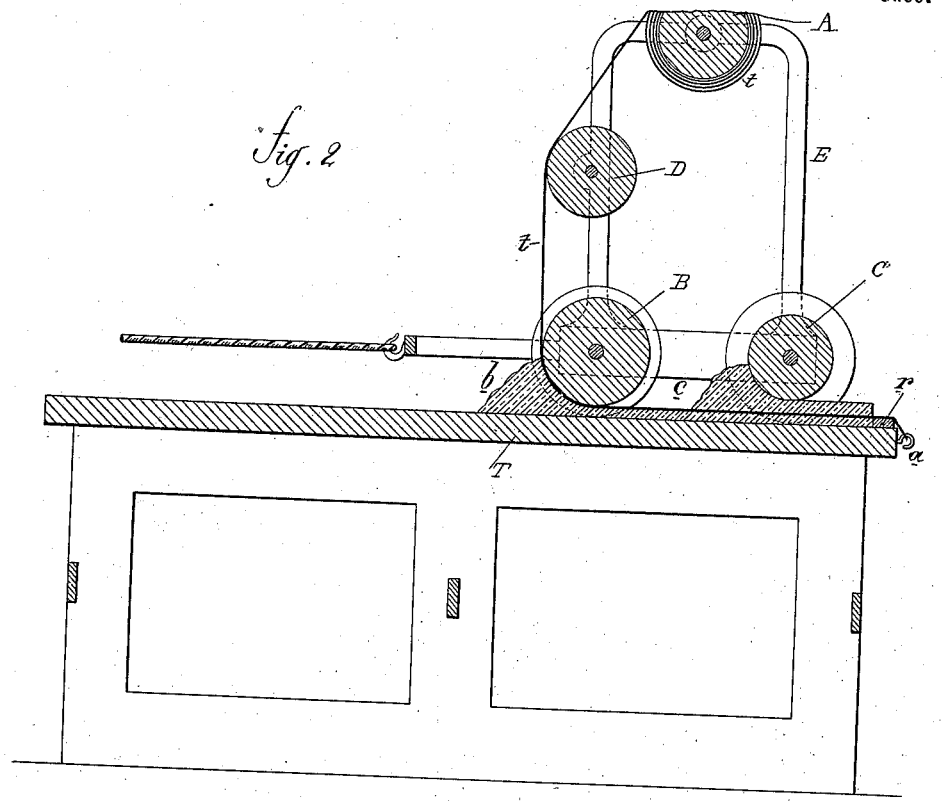

No. 608,096. Patented July 26, 1898.
L. APPERT.
MANUFACTURE OF GLASS WITH METALLIC NETTING EMBEDDED THEREIN.
(Application filed Apr. 27, 1894.)
(No Model.) 2 Sheets—Sheet 1.
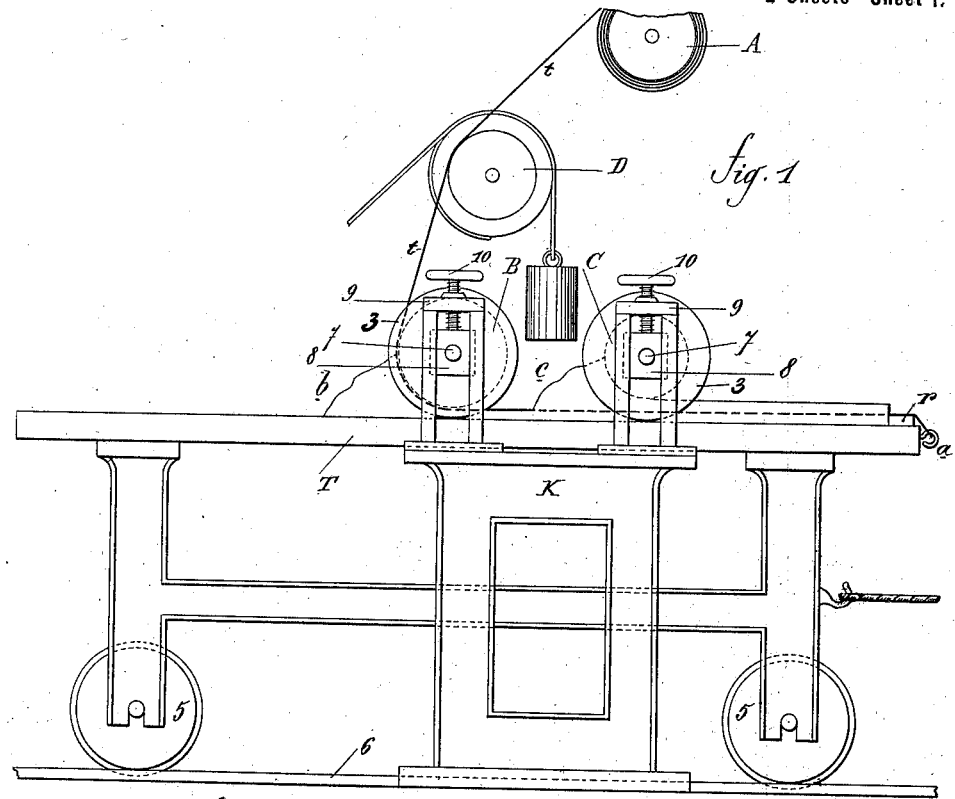
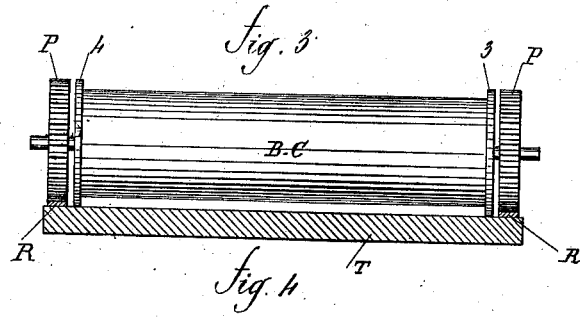
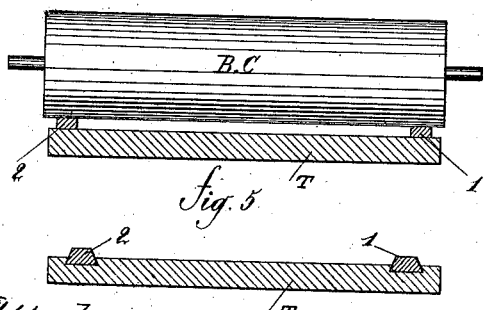
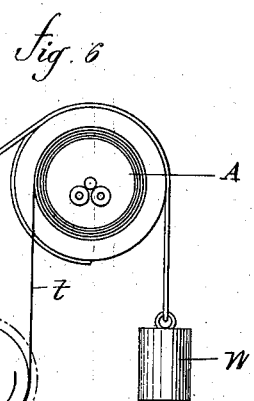
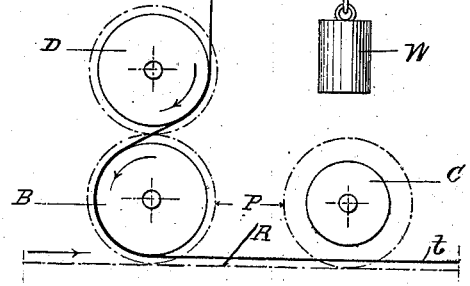
Inventor:
Leon Appert
by Pollok & Mauro
his attorneys
Attest:
Perry Lewis
W. R. Edelen.

No. 608,096. Patented July 26, 1898.
L. APPERT.
MANUFACTURE OF GLASS WITH METALLIC NETTING EMBEDDED THEREIN.
(Application filed Apr. 27, 1894.)
(No Model.) 2 Sheets—Sheet 2.

Attest:
W. R. Edelen

Inventor:
Leon Appert
by Pollok Mauro
his attorneys

UNITED STATES PATENT OFFICE.

LEON APPERT, OF PARIS, FRANCE.

MANUFACTURE OF GLASS WITH METALLIC NETTING EMBEDDED THEREIN.

SPECIFICATION forming part of Letters Patent No. 608,096, dated July 26, 1898.

Application filed April 27, 1894. Serial No. 509,244. (No model.) Patented in France October 19, 1893, No. 233,528, and in Germany October 30, 1893, No. 81,426.

*To all whom it may concern:*

Be it known that I, LEON APPERT, a citizen of the French Republic, residing at Paris, in the Department of the Seine, France, have invented a new and useful Improvement in the Manufacture of Glass with Metallic Netting Embedded Therein, (patented in France October 19, 1893, No. 233,528, and in Germany October 30, 1893, No. 81,426,) which improvement is fully set forth in the following specification.

The importance and value for various purposes of glass reinforced by a metallic trellis or network embodied therein are well understood and need not here be set forth. It has therefore been very desirable to discover a process which while admitting of the production of such article under conditions analogous to those attending the manufacture of ordinary rolled glass, and consequently at a moderate price, would preserve all the essential qualities of limpidity and transparency of the glass without reducing its resistance or increasing its fragility. Attempts in this direction were made in 1886, when it was proposed to place a metallic trellis or network between two glass plates and unite the latter. That attempt, however, was unsuccessful, as the product possessed neither homogeneity nor cohesion. In 1892 it was proposed to obtain the desired result by forcing into the body of molten glass a metallic network or trellis. The chief difficulties attending this process are that a netting of light wires (such as it is very important to use, so as not to impair the essential properties of transparency and limpidity) could not be forced in that manner into the body of the glass and that it is not easy by this plan to embed the netting regularly and at the proper uniform distance from the surfaces of the sheet.

To satisfy the various conditions which this manufacture requires, it is necessary, first, that the metallic trellis be introduced into the glass paste in a regular manner and at such distance from the surface of the sheet as may be determined upon beforehand, and, second, that a trellis with wires as thin as possible and with a very large mesh should be employed, so as not to impair the transparency and solidity of the glass.

The object of the present invention is to accomplish the desirable results above specified, and it is characterized by the continuous and progressive formation of two layers of molten glass and the simultaneous introduction between them of the metallic trellis or network and the compression of the whole into a solid, uniform, and homogeneous body or sheet. The simultaneous formation of the two layers, with the fabric inclosed between them, and the progressive formation of the complete product make my invention practical, successful, and economical, and distinguishes it from the processes referred to above.

The mechanical arrangements which I have devised to carry out this process and which, by way of example, are illustrated in the accompanying drawings, are such that the metallic netting is placed on the first layer of melted glass of predetermined thickness and soldered thereto, while the second layer of glass is poured simultaneously and directly on top of the wire-netting, which second layer unites with the first and whose thickness after being rolled down gives the desired thickness to the entire sheet.

Figure 7:
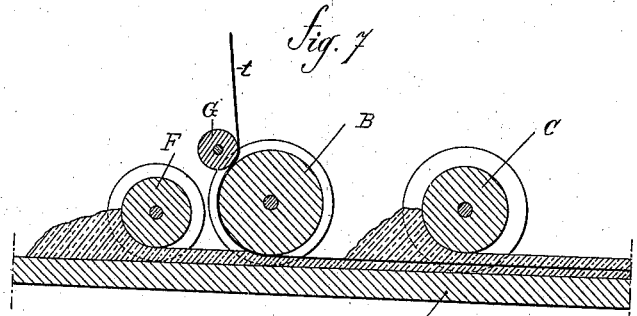
Figure 8:
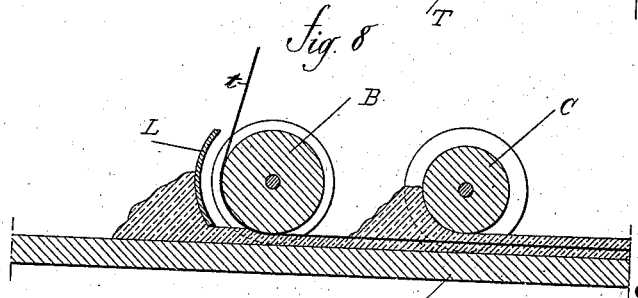

In the drawings, Figures 1 and 2 are views, respectively in elevation and vertical section, of apparatus suitable for carrying out the invention. Figs. 3, 4, and 5 are details in section and elevation transverse of the molding-table. Fig. 6 is a diagram in side elevation. Figs. 7 and 8 are details in longitudinal section illustrating modified arrangements.

The netting is prepared of a length and thickness equal to or preferably slightly less than the dimensions of the desired sheet and rolled on a spool A, placed at the top of the apparatus, as shown in Figs. 1 and 2.

In Fig. 1 the rolling or pressing devices are fixed and the table movable, while in Fig. 2 the table is stationary and the rolling devices movable.

One end *a* of the metallic netting is temporarily attached to the end of table T, upon which the glass is poured. This netting *t* is supported by a rule *r*, which supports it at the required distance from the surface of the table. Between roller A and the point of attachment $a$ the netting is supported by a metallic roller B, which runs upon two steel rails 1 2 on table T, these rails having a thickness corresponding to that to be given to the first layer of glass, as indicated in Figs. 4 and 5, or the roller may be provided with flanges 3 and 4, turned to the proper thickness, as indicated in Figs. 1, 2, and 3. Behind roller B and parallel with it is another pressure-roller C, also supported on the table in a manner similar to roller B, but at a sufficiently greater distance from the table T to give the finished sheet its proper thickness.

Roller C is placed at a distance from roller B such that the melted glass may be poured from a ladle or crucible between them. This distance may vary according to the nature of the glass employed and according to the thickness of the sheet, but that distance once determined for a particular product should be maintained during its entire manufacture.

The apparatus operates, according to whether the table is movable or stationary, as follows: In the first instance, Fig. 1, the table is supported on wheels 5, running on rails 6, suitably distanced. The pressure-rollers B C are mounted on shafts 7, journaled in bearings 8, adjustable in ways 9, the latter being supported by the stationary frame K. Adjusting-screws 10 are provided to regulate the pressure of the rollers on the glass. Ways 9 of roller C may be brought closer to or removed farther from those of roller B. Moreover, the pinion P, carried by the shaft, engages rack R, Fig. 3, running lengthwise of the table, so that the rollers turn at a surface speed corresponding with that of the table.

A fourth roller D may be provided, which has the same speed as roller B and is placed above it, as shown in Figs. 1 and 6. Its object is to carry the netting $t$ and at the same time spread it transversely. To obtain the latter effect, the surface of this roller may be made like a carding-cylinder, being furnished with projections, with which the wires of the netting may momentarily engage, the roller being like a barrel.

To maintain the tension of the netting, it is advisable to provide roller A, upon which the netting is wound, with a brake of any sort, such as a weight W, Fig. 6.

To make the glass, I proceed as follows: The netting being attached to the table by wires as fine as can be used, the glass is poured in the ordinary manner on table T in front of the roller B, as indicated at $b$, and at the same time the table is set in motion. The netting, actuated tangentially to roller B, becomes immediately incorporated with the glass, which at the same time and by the action of the same roller is rolled down to a uniform thickness. The netting is thus placed and remains at the determined distance from the surface of the table. As soon as the operation has fairly commenced a fresh quantity of melted glass is poured between rollers B C at $c$. This batch of glass in its turn is rolled down upon that first poured, becoming perfectly united to it and forming a homogeneous sheet of glass of the definite dimensions desired. Thus the operation continues progressively.

In the second case, where the table is fixed, Fig. 2, the spool A of netting is placed at the top of the movable frame E. One end of the netting is attached to the table, as before. The portion of the netting between the spool and point of attachment is supported by a tension-roller D and passes under roller B at the proper distance from the table. The rollers B, D, and C are carried by frame E, which is in operation moved over the surface of the table. The operation of pouring the layers of glass and rolling the same is effected in the manner already described. The rolling being performed, the wires which attach the netting to the table are quickly severed, and the whole sheet is carried immediately to the annealing-furnace, where it is reheated to the annealing-point in the usual way. For a second operation the spool is replaced by another and brought to a proper tension. The operation then proceeds as before.

It will be seen that in this process there is no obstacle to the production of sheet-glass of all the usual dimensions as commonly made by rolling; but to avoid all possibility of the netting being distorted or misplaced, which is the more likely to occur with the large-mesh fabric made of very fine wires, it is preferably fixed to spool A by means which automatically attach and release it at the moment its last end comes under roller B. It will be observed that since the spool A is some distance from the roller B the netting must be attached to the former by a flexible material capable of being unwound and of a length sufficient to reach from the spool to the under side of roller B. This attaching-web may be of any fabric or material which is destroyed by heat, so that the moment it comes into contact with the melted glass it will part from the netting, the latter being until that moment maintained under proper tension.

This process of manufacture, with embodied metallic netting, is very simple and will add but slightly to the cost of ordinary sheet-glass.

Where, from the nature of the glass or of the netting used, or where, in consequence of the physical condition of the latter, there is need that the netting should remain in contact for a minimum time with the fluid glass first poured in front of roller B, the apparatus may be modified by placing in front of said roller, as shown in Fig. 6, supplemental roller F of the same or of smaller diameter, but always of such dimensions that the glass at the time of pouring shall not ride over it. This roller F also receives movement of rotation and effects a preliminary rolling down of the first layer, which is completed by roller B while incorporating the netting into the surface of the sheet of glass. The roller F may be replaced by a blade or scraper L, as shown in Fig. 7, and having the same object—namely, to protect the netting against immediate contact with the glass at the moment of pouring. The lower edge of the blade is arranged a suitable distance from the table, so that the glass passes underneath it in the form of a sheet, into which the first cylinder embeds the netting, as before stated, while bringing the layer to its final thickness.

In some cases it may be advantageous in order to prevent the bulging of the metallic trellis to press it against the roller B by means of a small roller G, as shown in Fig. 7.

The invention obviously is not limited to the use of the precise apparatus described, since the principle thereof may be applied in various ways; nor is it limited to the production of smoothed surfaced sheets, since the latter may have impressed thereon in the process of manufacture designs in intaglio or rilievo on one or both sides.

What I claim as my invention is—

1. The process of making sheets of glass with a metallic trellis embedded therein, said process consisting in pouring and rolling out a layer of glass simultaneously applying the trellis to the surface thereof, pouring a second layer of glass upon the trellis and rolling the same, the operation being carried on progressively, substantially as described.

2. The described apparatus for manufacture of glass sheets with an embedded network, said apparatus comprising pressure devices or rollers one behind the other for simultaneously acting upon several superposed layers of glass, the rollers being separated a sufficient distance to form a pouring-space, and a spool for the netting and devices for feeding the same under the first pressure device or roller, the table and pressure devices being movable one relatively to the other, substantially as described.

3. The combination with the table upon which the sheet of glass is to be formed, of pressure-rollers for forming simultaneously several layers of glass, the periphery of the second pressure-roller being supported at a greater distance from the surface of the table than that of the first roller, a spool for the wire-netting, and means for conducting the same under the first pressure-roller, so that the latter while rolling out the first layer incorporates the netting therewith, substantially as described.

4. The combination of the table, the pressure-rollers supported at different distances above the surface of the table, the spool and devices for feeding the wire-netting under the first roller as the latter moves over the surface of the glass, and means for applying tension to the wire-netting, substantially as described.

5. The combination with the table, the pressure-rollers supported at different distances from the table for simultaneously forming several superposed layers of glass and uniting them into a single sheet, the means for unwinding a spool of wire-netting as the rolling proceeds and passing it around the pressure-roller that compresses the first layer, and a supplemental roller or shield acting upon the molten glass in front of said pressure-roller, substantially as and for the purpose described.

In testimony whereof I have signed this specification in the presence of two subscribing witnesses.

LEON APPERT.

Witnesses:
 CLYDE SHROPSHIRE,
 JULES FAYOLLET.